March 16, 1954  J. T. ASHTON  2,672,003
TRASH BLOWER FOR CORN SNAPPING ROLLS
Filed Feb. 5, 1951
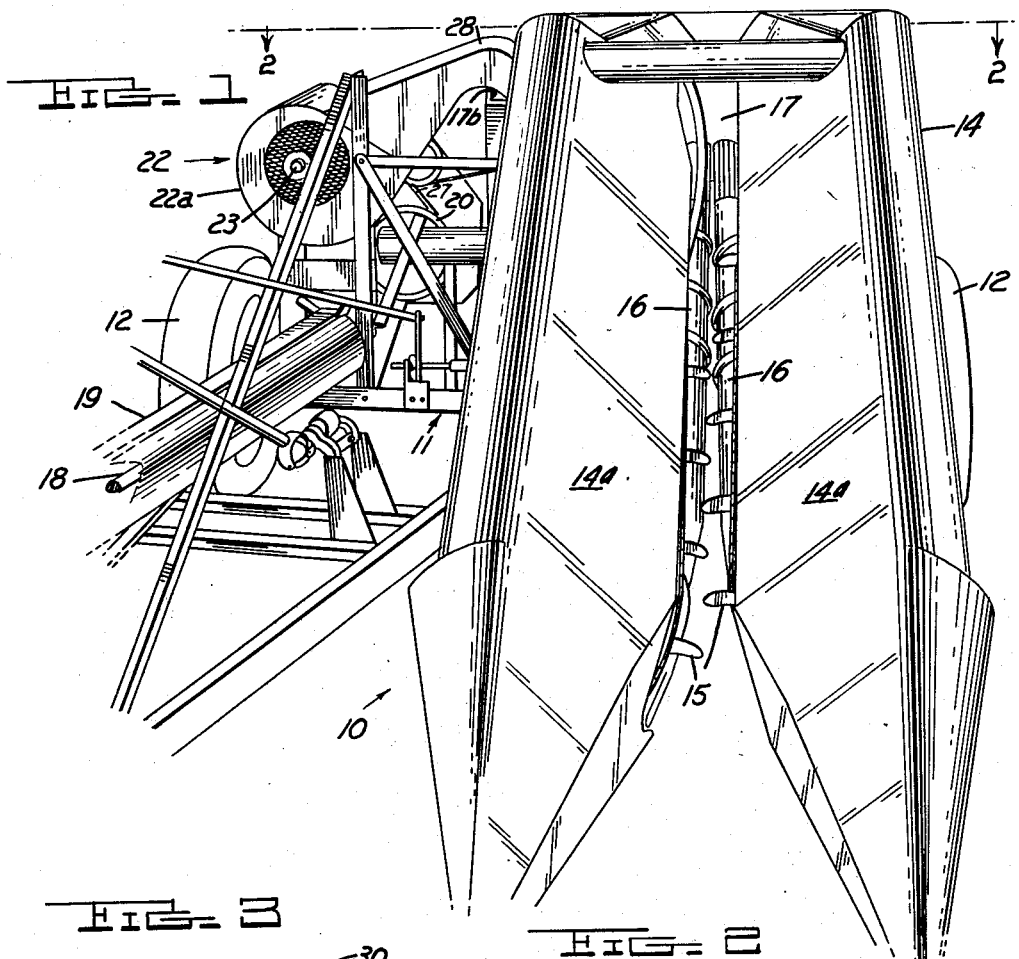
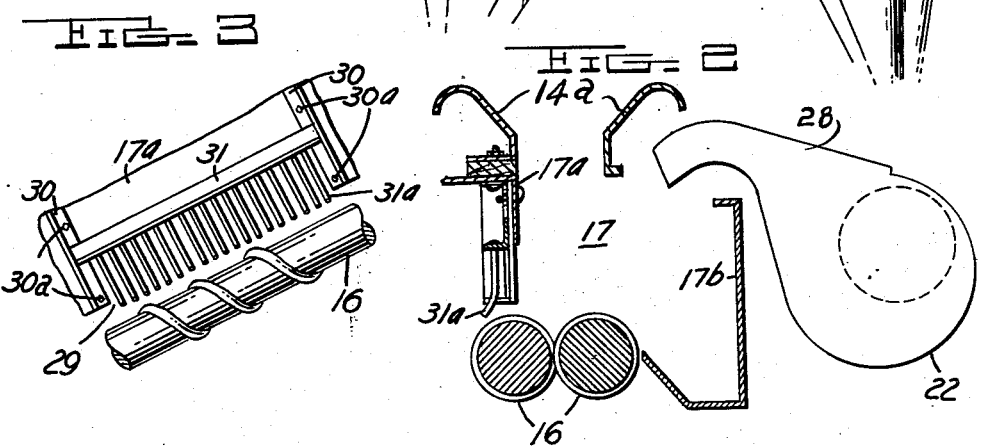
INVENTOR.
JAMES T. ASHTON
BY
ATTORNEY Patented Mar. 16, 1954

2,672,003

UNITED STATES PATENT OFFICE 2,672,003

TRASH BLOWER FOR CORN SNAPPING ROLLS

James T. Ashton, Des Moines, Iowa, assignor to Wood Bros. Inc., Des Moines, Iowa, a corporation of Iowa Application February 5, 1951, Serial No. 209,488

2 Claims. (Cl. 56—111)

This invention relates to an improved arrangement for corn harvesters to facilitate clearing of trash from the snapping rolls of the harvester. In harvesting corn by conventional machines which utilize a pair of rotating snapping rolls, the accumulation of trash at the upper ends of such rolls is always a problem in the harvesting operation. While this trash generally comprises mainly the leaves, upper stalk portions of the plant and husks, such material not only tends to clog the mechanism of the harvesting machine but is also carried along into storage with the corn ears.

Accordingly, it is an object of this invention to provide an improved trash clearing arrangement for a corn harvesting machine.

Another object of this invention is to provide a device for a corn harvesting machine which permits continuous removal of unwanted vegetation from the snapping rolls while preventing loss of snapped ears of corn.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Fig. 1 is a perspective view of a corn harvesting machine of a type to which this improved trash clearing device may be applied, showing particularly the mounting of a blower for directing a blast of air on the snapping rolls.

Fig. 2 is a schematic sectional view taken on line 2—2 of Fig. 1 showing the relative position of the snapping rolls, blower outlet and trash rake.

Fig. 3 is an enlarged detail view of the trash rake.

As shown on the drawings:

Briefly, this invention contemplates the use of a blower so mounted on a corn harvesting machine that the blast of air from such blower will be directed downwardly and laterally across the upper ends of the snapping rolls of the corn harvesting machine to remove excess trash from such region and deposit same on the ground. An opening substantially opposite the discharge orifice of the blower is provided to enable the blast of air to readily escape on the opposite side of the harvesting mechanism and to carry away the trash cleared from the harvesting mechanism by the blast of air. A trash rake is mounted in the opening comprising a plurality of self- cleaning tines depending from a supporting bar to prevent loss of corn ears through the opening, thus providing an unimpaired path for the air blast and permitting escape of undesired vegetation.

In Fig. 1 there is shown a corn harvester indicated generally by the numeral 10 which incorporates the improved trash clearing device of this invention. Harvester 10 comprises a main frame 11 which is transported by a pair of wheels 12 rotatably mounted on suitable stub axles (not shown). Frame 10 mounts a forwardly projecting corn gathering unit 14 which is of conventional construction, including a pair of laterally spaced sheet metal guide troughs 14a and a plurality of gathering chains 15. At the bottom of the sheet metal trough portions 14a a pair of rearwardly inclined, power driven snapping rolls 16 are mounted in conventional fashion. The upper ends of snapping rolls 16, where most of the snapping and/or husking action is performed on the ears of corn, are disposed in a space which can be most conveniently described as a snapping chamber 17, which is defined by laterally spaced sheet metal walls 17a and 17b. The wall 17b is laterally displaced a substantial distance from the snapping rolls 16 so as to permit the bottom portions of a wagon elevator (not shown) to project into the chamber 17 for receiving corn ears which are snapped by the rolls 16.

The various moving parts of corn harvester 10 are power driven by a shaft 18 covered by a shield 19. Shaft 18 is generally connected to the power-take-off shaft of a tractor (not shown). Rearwardly of wheel 12 as shown in Fig. 1, a sheave 20 is secured to the rear end of shaft 18. Sheave 20 is the main power drive sheave from which the moving parts of the harvester are powered by belt drives in conventional fashion. The above described harvesting machine is of well known make and hence more detailed description thereof is believed unnecessary to provide a clear understanding of the use of this invention in conjunction with such a harvesting machine.

A blower 22 is mounted on frame 10 adjacent wheel 12 shown in Fig. 1 for directing a blast of air across the snapping chamber 17 and the snapping rolls 16. Blower 22 comprises a cylindrical housing 22a in which there is journaled a shaft 23, the axis of which is disposed concentrically relative to the axis of cylindrical housing 22a. A centrifugal fan (not shown) of conventional construction is mounted on shaft 23 within housing 22a and such fan is driven by a belt 27 surrounding sheave 20 and a suitable sheave (not shown) mounted on the rear end of shaft 23. Thus when shaft 18 is driven by the power take-off shaft of the tractor (not shown), sheave 20 is rotated to effect rotation of the fan contained within blower 22. The blast of air produced by the fan is directed downwardly and laterally across the upper ends of the snapping chamber and snapping rolls 16 by a sheet metal discharge spout 28 mounted on the fan housing 22a, as best shown in Fig. 1.

It has been, of course, a common expedient to direct a blast of air in the vicinity of the snapping rolls of a corn picker. However, in prior constructions the air blast produced was more or less trapped within the trough defined by the sheet metal elements commonly provided adjacent the snapping rolls and, as a result, a great deal of air turbulence was produced but no clearly defined air flow was created which would insure that the trash commonly encountered near the top of the snapping rolls would be carried to the exterior of the machine.

In accordance with this invention, a rectangular opening 29 is provided in the wall 17a of snapping chamber 17 at a point immediately above the upper end of the snapping rolls 16. A pair of angle iron stiffening members 30 are respectively provided on each vertical edge of rectangular opening 29 and such stiffening members are secured to wall 17 by bolts 30a. Adjacent the horizontal or upper edge of opening 29 there is transversely secured by welding a rake supporting angle bar 31. A plurality of depending rod-like tines 31a are secured to rake support 31 by welding or by upsetting the ends of such tines in suitably spaced apertures (not shown) provided in support 31. Tines 31a are slightly curved outwardly as shown in Fig. 2 in the direction of the air blast, and extend downwardly to a point adjacent to, but spaced from the snapping rolls 16. The curved configuration permits the tines to be self-cleaning.

With the described construction, a high intensity air blast is produced downwardly across the snapping chamber 17 and the upper ends of snapping rolls 16 and outwardly through the trash rake defined by the tines 31a. Since such air blast is both downwardly and laterally directed with respect to the snapping rolls 16, it is assured that the trash will be blown free of the machine and not merely elevated to fall back on other portions of the rolls or the machine. Substantially all trash is thus continuously blown out of the snapping chamber 17 through the spaced apart tines 31a. Such tines, however, retain snapped ears of corn on the snapping rolls to prevent loss thereof until discharged off the other side of the snapping rolls.

From the above description it will be clearly apparent that there is here provided a blower and trash rake arrangement which will effectively permit removal of unwanted trash from a corn harvesting machine to substantially eliminate clogging of the snapping rolls and to provide a harvested crop substantially free of unwanted vegetation.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a corn harvesting machine having a pair of inclined snapping rolls provided with upper snapping portions and sheet metal elements defining first and second generally vertical walls of a snapping chamber surrounding the upper portions of the snapping rolls, the improvements comprising a blower having a discharge spout adjacent said first wall in said chamber and directed across the upper portions of said snapping rolls toward said second side wall of the chamber, said second wall having an aperture therein substantially opposite said discharge spout to permit said air blast to flow out of said snapping chamber, and spaced barrier elements disposed across said aperture to permit trash to pass therebetween but preventing passage of snapped corn ears.

2. In a corn harvesting machine having a pair of inclined snapping rolls provided with upper snapping portions and sheet metal elements defining first and second generally vertical walls of a snapping chamber surrounding the upper portions of the snapping rolls, the improvements comprising a blower having a discharge spout adjacent said first wall in said chamber and directed across the upper portions of said snapping rolls toward said second side wall of the chamber, said second wall having an aperture therein substantially opposite said discharge spout to permit said air blast to flow out of said snapping chamber, and a plurality of spaced generally vertically extending tines disposed across said aperture to permit trash to pass therebetween but preventing passage of snapped corn ears.

JAMES T. ASHTON.

References Cited in the file of this patent

UNITED STATES PATENTS

| Number | Name | Date |
|---|---|---|
| 1,660,767 | Ronning et al. | Feb. 28, 1928 |
| 1,922,374 | Krause | Aug. 15, 1933 |
| 2,340,084 | Scranton | Jan. 25, 1944 |
| 2,379,802 | Hyman | July 3, 1945 |
| 2,448,446 | La Pointe | Aug. 31, 1948 |
| 2,492,897 | Siefken | Dec. 27, 1949 |